United States Patent [19]
Baskett et al.

[11] Patent Number: 5,161,425
[45] Date of Patent: Nov. 10, 1992

[54] ADJUSTABLE STEERING COLUMN MECHANISM

[75] Inventors: William C. Baskett, Maldon; Gordon M. Denney, Chelmsford, both of England

[73] Assignee: Ford Motor Company, Dearborn, Mich.

[21] Appl. No.: 644,812

[22] Filed: Jan. 23, 1991

[30] Foreign Application Priority Data

Jan. 27, 1990 [GB] United Kingdom ............. 9001907.6

[51] Int. Cl.5 .......................... B62D 1/18; G05G 5/06
[52] U.S. Cl. .......................................... 74/493; 74/529; 280/775
[58] Field of Search ............... 74/493, 529, 533, 536, 74/554; 280/775

[56] References Cited

U.S. PATENT DOCUMENTS

| | | | |
|---|---|---|---|
| 3,533,302 | 10/1970 | Hansen | 74/493 |
| 3,570,322 | 3/1971 | Krouse | 74/493 |
| 3,628,396 | 12/1971 | Grobowski | 74/493 |
| 3,799,569 | 3/1974 | Baker | 74/493 X |
| 4,041,796 | 8/1977 | Shishido | 74/493 |
| 4,078,448 | 3/1978 | Naka | 74/493 |
| 4,102,218 | 7/1978 | Naka et al. | 74/493 |
| 4,463,626 | 8/1984 | Kazaoka et al. | 74/493 |
| 4,472,982 | 9/1984 | Nishikawa | 74/493 |
| 4,530,254 | 7/1985 | Toyoda et al. | 74/493 |
| 4,541,298 | 9/1985 | Strutt | 74/493 |
| 4,594,909 | 6/1986 | Yamaguchi | 74/493 |
| 4,732,050 | 3/1988 | Vollmer | 74/493 |
| 4,793,204 | 12/1988 | Kubasiak | 280/775 X |
| 4,938,093 | 7/1990 | Matsumoto et al. | 74/493 |
| 5,074,586 | 12/1991 | Baskett | 280/775 |

FOREIGN PATENT DOCUMENTS

| | | | |
|---|---|---|---|
| 969071 | 6/1975 | Canada | 74/493 |
| 55-114665 | 9/1980 | Japan | 74/493 |
| 57-147957 | 9/1982 | Japan | 74/493 |
| 1018485 | 1/1966 | United Kingdom | 74/493 |
| 2217817 | 1/1989 | United Kingdom | |
| 2191173 | 12/1989 | United Kingdom | |

*Primary Examiner*—Leslie A. Braun
*Assistant Examiner*—Julie Krolikowski
*Attorney, Agent, or Firm*—Raymond L. Coppiellie; Roger L. May

[57] ABSTRACT

An adjustable steering column apparatus includes two opposed toothed surfaces 36, 38. One toothed surface is disposed on a bracket fixed to the vehicle body structure. The other toothed surface is formed on a clamp plate 24 which includes resilient wings 44, 46 which lift the mating toothed surfaces out of engagement when adjustment is to be carried out.

6 Claims, 1 Drawing Sheet

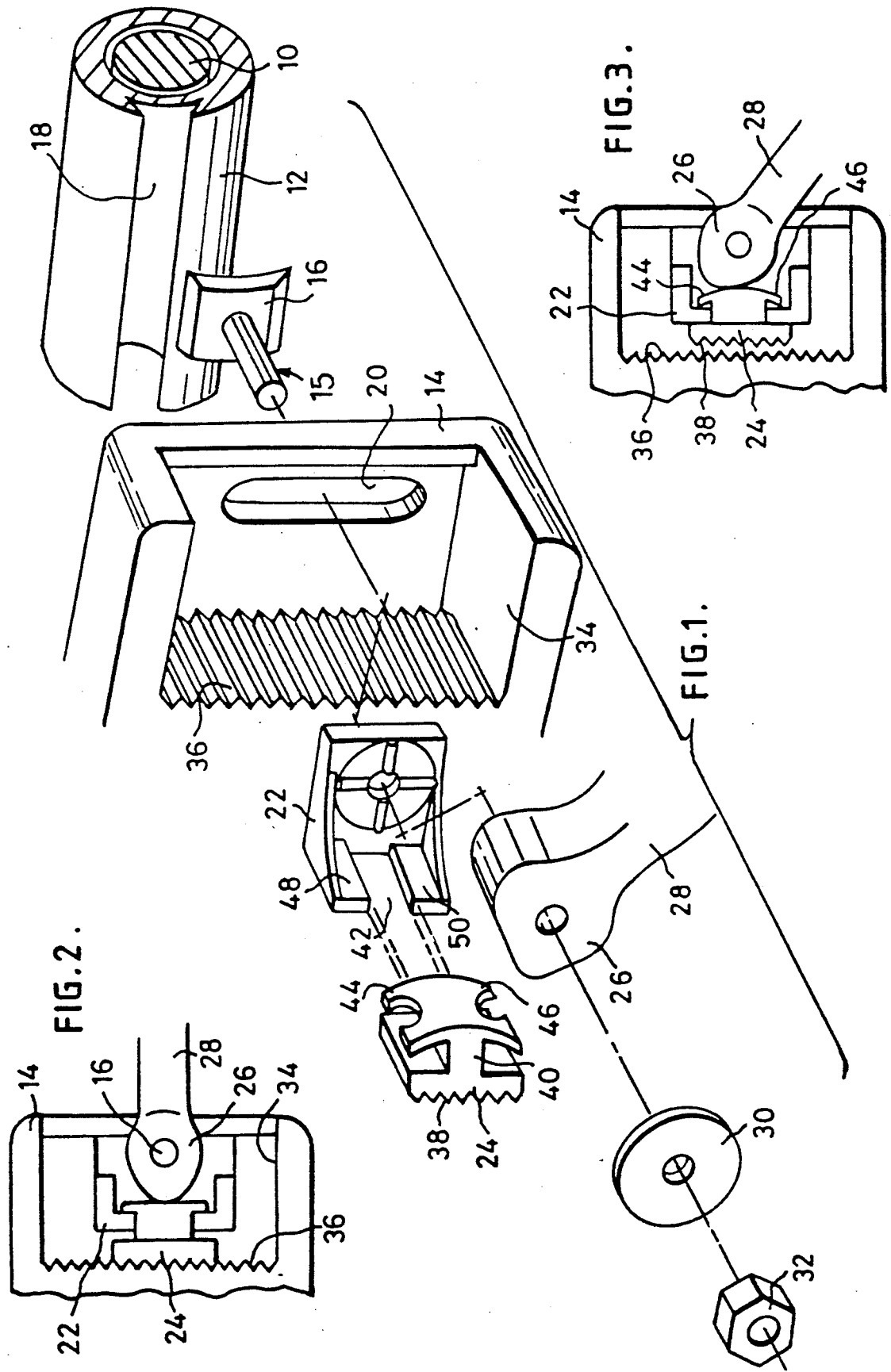

ADJUSTABLE STEERING COLUMN MECHANISM

BACKGROUND ON THE INVENTION

1. Field of the Invention

This invention relates to an adjustable steering column mechanism which can provide height adjustment of the steering wheel in a motor vehicle.

2. Disclosure Information

Various mechanisms have been proposed which provide height adjustment of the steering wheel in tiltable steering column assemblies of automotive vehicles. For example, British Patent Specification 2,191,273, corresponding to U.S. Pat. No. 4,732,050, shows a mechanism in which matingly engageable toothed plates provide a locking mechanism to lock the steering column in a variety of different positions. However, the specification fails to teach any means of biasing the toothed surfaces apart when adjustment is desired. The construction shown in this specification does not allow a smooth adjusting action because when the mechanism is released, the mating plates are not separated.

U.S. Pat. No. 4,541,298, assigned to the assignee of the present invention, discloses a height adjusting apparatus having a support for rotatably carrying a steering column member and a bracket carrying the support. The support moves relative to the bracket in two mutually perpendicular directions. The mounting assembly further includes a clamping device for clamping the bracket to the support, characterized in that two rack and pinion sets are connected between the bracket and the support such that movement of the support relative to the bracket in each of the mutually perpendicular directions causes the pinions to roll relative to the racks of the respective rack and pinion sets. The clamping device increases the frictional forces opposing the relative movement of the rack and pinion.

British patent application 2,217,817, corresponding to U.S. Ser. No. 07/606,241, filed by the assignee of the present invention on Oct. 31, 1990, now U.S. Pat. No. 5,074,586, discloses a steering column construction wherein the height and reach adjustment are provided by a single lever arm. The apparatus includes a cam wall against which the lever operates to lock the steering column into a desired position. The '817 apparatus does not rely on matingly engageable teeth to provide a positive lock of the steering column in a desired position.

Various other height adjusting mechanisms have been proposed which utilize matingly engageable teeth to lock or unlock the position of the steering column to achieve a desired position. For example, British Patent No. 1,018,485, and U.S. Pat. No(s). 4,041,796; 4,078,448; 4,102,218; 4,463,626; 4,472,982; 4,530,254; 4,594,909; and 4,938,093 all disclose mechanisms which rely on the mating engagement of teeth to achieve a desired height position of the steering wheel. However, all of the mechanisms rely on an external spring attached to a component within the steering column to provide a biasing force to either clamp or unclamp the mating teeth.

It is an advantage of the present invention to provide a height adjusting apparatus wherein a pair of matingly engageable teeth sets cooperate to lock the steering column in a desired height position and wherein one set of the teeth includes an integrally formed biasing means to unclamp the teeth when adjustment is desired and eliminate a need for relying on external springs.

These and other advantages, objects and features of the present invention will become apparent from the summary, drawings, detailed description and claims which follow.

SUMMARY OF THE INVENTION

In accordance with the present invention, there is provided an apparatus for adjusting the position of a tiltable steering column in an automotive vehicle, the apparatus having a bracket connected to the vehicle body structure and a locking member connected to the steering column. The bracket and the locking member each includes a set of cooperating teeth which engage in a series of different relative positions to secure the column at different positions relative to the body structure. The locking member further includes biasing means integral therewith which forces the locking member out of engagement with the set of teeth of the bracket when height adjustment is desired.

In one embodiment, the teeth of the locking member are provided on a clamping plate movable into and out of engagement with the teeth on the bracket, the movement into engagement being produced by an externally applied force and the movement out of engagement being provided by a biasing force produced by an integral part of the clamping plate. The biasing force is produced by integrally molded resilient wings on the clamping plate which press against a supporting plate when the teeth move into or out of engagement with one another.

BRIEF DESCRIPTION OF THE DRAWINGS

FIG. 1 is an exploded view of a steering column apparatus structured in accordance with the principles of the present invention.

FIG. 2 shows the assembled apparatus of FIG. 1 in the locked position.

FIG. 3 shows the assembled apparatus of FIG. 1 in the unlocked position.

DETAILED DESCRIPTION OF THE PREFERRED EMBODIMENTS

Referring now to the drawings, FIG. 1 shows steering column assembly comprising a steering shaft 10 and a steering shaft casing 12. A bracket 14 having a longitudinal axis generally parallel to the axis of the steering shaft 10 is securely mounted to the vehicle chassis or body structure. Alternatively, the bracket 14 could be pivotally mounted to the vehicle chassis as generally shown in European Pat. Application 89304558.3, corresponding to British patent application 2,217,817 and U.S. Ser. No. 07/606,241, filed Oct. 31, 1990 and assigned to the assignee of the present invention, now U.S. Pat. No. 5,074,586, the disclosure of which is hereby incorporated by reference.

As further shown in FIG. 1, the steering column is supported near the top end of the column proximate the steering wheel on the bracket 14 by means of a pin fastener, such as T-bolt 15. The head 16 of pin fastener 15 is positioned in a dovetail slot 18 formed in the side of the steering column casing 12. The shank of the bolt 16 passes through a slotted aperture 20 in the bracket 14 so that the steering column can be rotated up and down in a direction generally perpendicular to the longitudinal axis of the steering shaft to position the steering column to a desired height. The height adjustment of the steering column is limited by the available movement of the fastener 15 in aperture 20.

The steering column assembly of the present invention further includes a support plate 22 carrying a clamping plate 24. The support plate 22 and clamping Plate 24 are supported on the shank of fastener 15. A lever 28 having a cam-shaped head 26 is also fitted on the shank of fastener 15, followed by a washer 30 and a nut 32. The support plate 22, clamping plate 24 and cam 26 are house in a recess 34 formed in bracket 14 on a side of the bracket opposite the steering column. As will be explained below, support plate 22, clamping plate 24, cam 26 and recess 34 form a locking member for adjusting the height position of the steering column relative to bracket 14.

One wall of recess 34 includes a first set of teeth 36 which are matingly engageable with a second set of teeth 38 formed on one face of clamping plate 24. The clamping plate 24 further includes a stem 40 which is received in slot 42 formed between shoulders 48 and 50 of support plate 22. Disposed on the end of the stem opposite the toothed face of the clamping plate 24 are resilient wings 44, 46 which bear against shoulders 48, 50. In the preferred embodiment, clamping plate 24, including stem 40 and resilient wings 44, 46 are molded integrally as a single unit from a synthetic polymeric material in any of a number of known manufacturing techniques, such as injection molding. The resilience of wing 44, 46 is an inherent property of the shape of the wings and the material chosen.

The manner in which the apparatus of the present invention operates will become apparent from FIGS. 2 and 3. In FIG. 2, the lever 28 has been turned to a position where a lobe of the cam head 26 presses on the clamp plate 24, overcomes the spring force exerted by the resilient wings 44, 46 and presses the second set of teeth 38 of clamping plate 24 against the first set of teeth 36 of bracket 14. In this position, the steering column is locked and the bolt 15 cannot move along the elongate slot 20.

However when the lever 28 is moved through an angle of about 60° to the position of FIG. 3, the lobe of the cam 26 is lifted off the clamp plate 24 and the resilient wings 44 and 46 act against the shoulders 48, 50 to lift the clamp plate 24 away from the teeth 36. In this manner, the resilient wings act as a means for biasing the clamping plate 24 out of engagement with the first set of teeth 36 formed in recess 34 of bracket 14. In this position the two sets of teeth 36, 38 are withdrawn from each other and the steering column can be moved (by grasping the steering column and lifting or lowering) to alter the height of the steering wheel. When this happens the bolt 16 slides up and down in the slot 20 until the desired position is reached where upon the lever 28 is once more turned to produce the clamping action shown in FIG. 2.

The apparatus described here can be combined with an apparatus which allows the reach of the steering column to be adjusted, with the lever 28 being able to release and lock the reach adjustment at the same time as it releases and locks the height adjustment as just described. In this manner, both the height and reach adjustment can be locked into the desired position with a single movement of lever 28.

Various other modifications and permutations of the present invention will no doubt be apparent to those skilled in the art. Therefore, it is the following claims, including all equivalents which define the scope of the present invention.

We claim:

1. An apparatus for adjusting the position of a tiltable steering column in an automotive vehicle, said steering column having a steering shaft rotatably mounted in said steering column, said apparatus comprising:

a bracket fixedly secured to the vehicle body structure, said bracket including a first set of teeth;

a clamping plate connected to said steering column, said clamping plate including a second set of teeth disposed on one face thereof and operative to meshingly engage said first set of teeth in a series of different relative positions to secure said steering column at different positions relative to the vehicle body structure under the application of an external force against said locking member, said clamping plate further including at least one resilient wing formed integrally with said clamping plate, said at least one resilient wing operative to produce a biasing force to move said clamping plate out of engagement with said bracket.

2. An apparatus according to claim 1, wherein said locking member further includes a support member for receiving said clamping plate therein and for supporting said clamping plate for movement into and out of engagement with said bracket.

3. An apparatus according to claim 1, wherein said clamping plate further includes a stem interposed between said face having said second set of teeth thereon and said at least one resilient wing.

4. An apparatus according to claim 3, wherein said at least one resilient wing extends laterally from an end face of said stem to provide a smooth surface on which the externally applied force can act.

5. An apparatus according to claim 4, wherein the externally applied force is exerted by a pivoted cam, said cam being mounted on a lever arm.

6. A fastening device for a tiltable steering wheel assembly including a steering shaft rotatably supported in a steering column of an automotive vehicle, comprising:

a bracket fixedly secured to the vehicle body structure, said bracket including a first set of teeth;

a locking member connected to said steering column, said locking member comprising a clamping plate including a second set of teeth disposed on one face thereof and at least one resilient wing formed integrally therewith, said at least one resilient wing operative to produce a biasing force to move said locking member out of engagement with said bracket whereby said second set of teeth meshingly engage said first set of teeth in a series of different relative positions to secure said steering column at different positions relative to the vehicle body structure under the application of an external force against said at least one resilient wing, said force being applied by a pivoted cam, said cam being mounted on a lever arm.

* * * * *